Patented Aug. 26, 1941

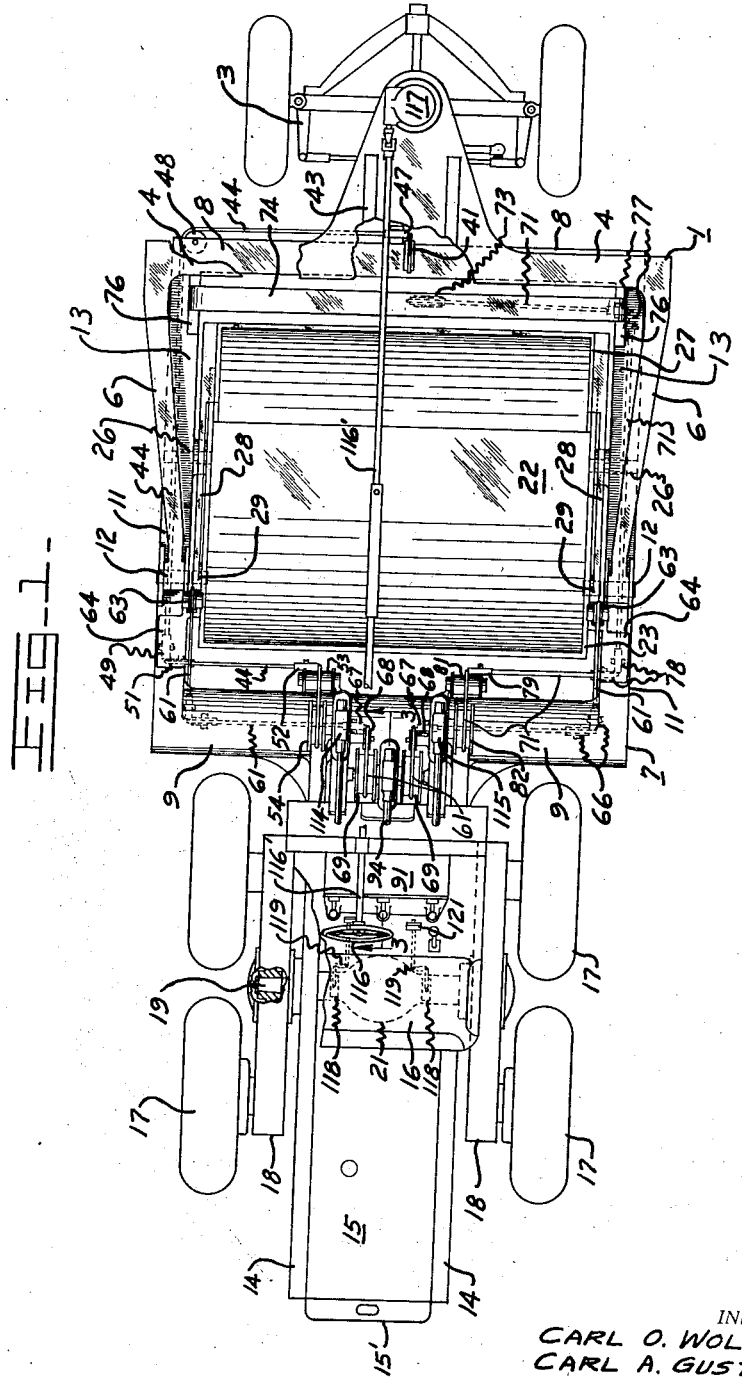

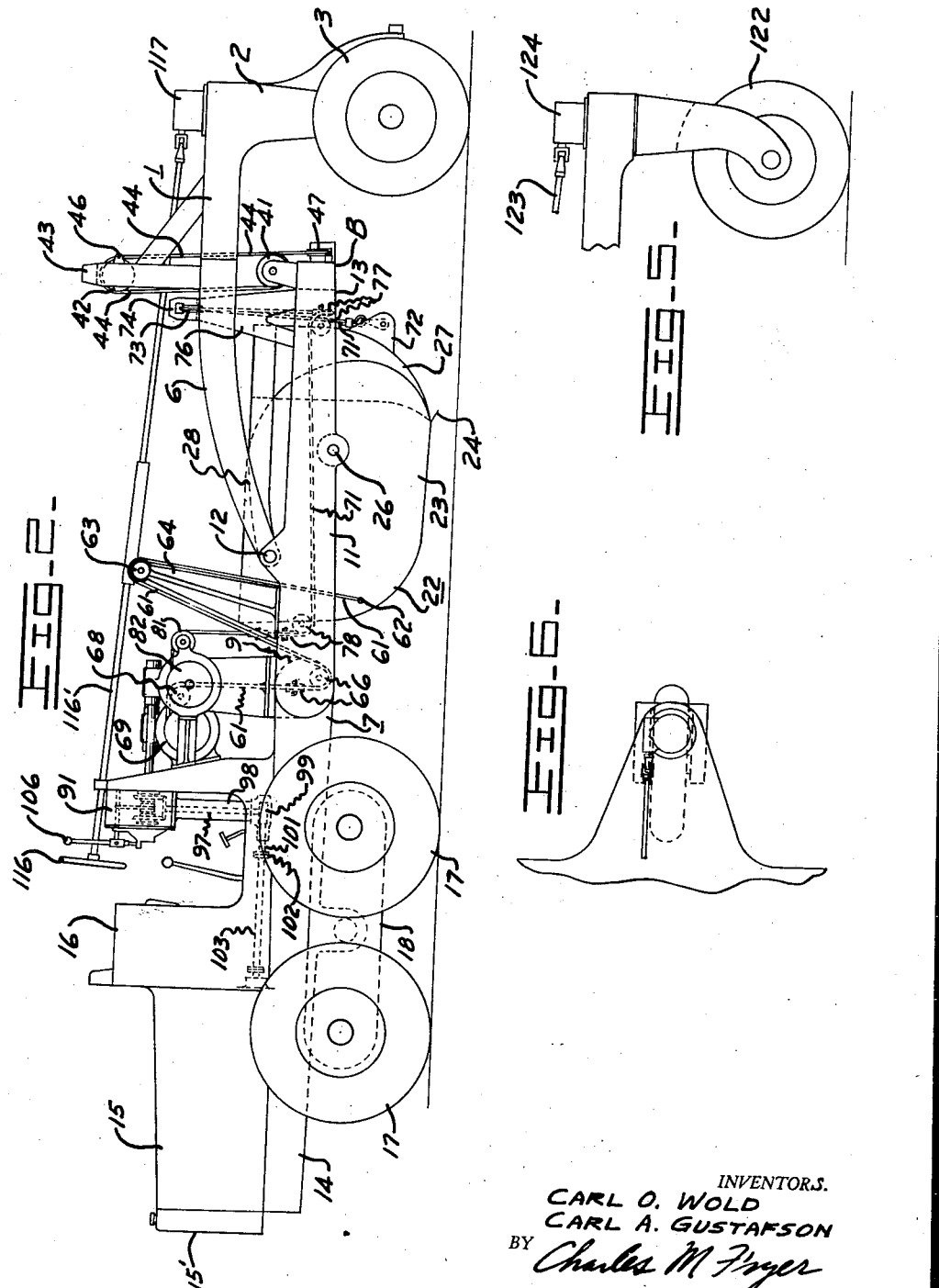

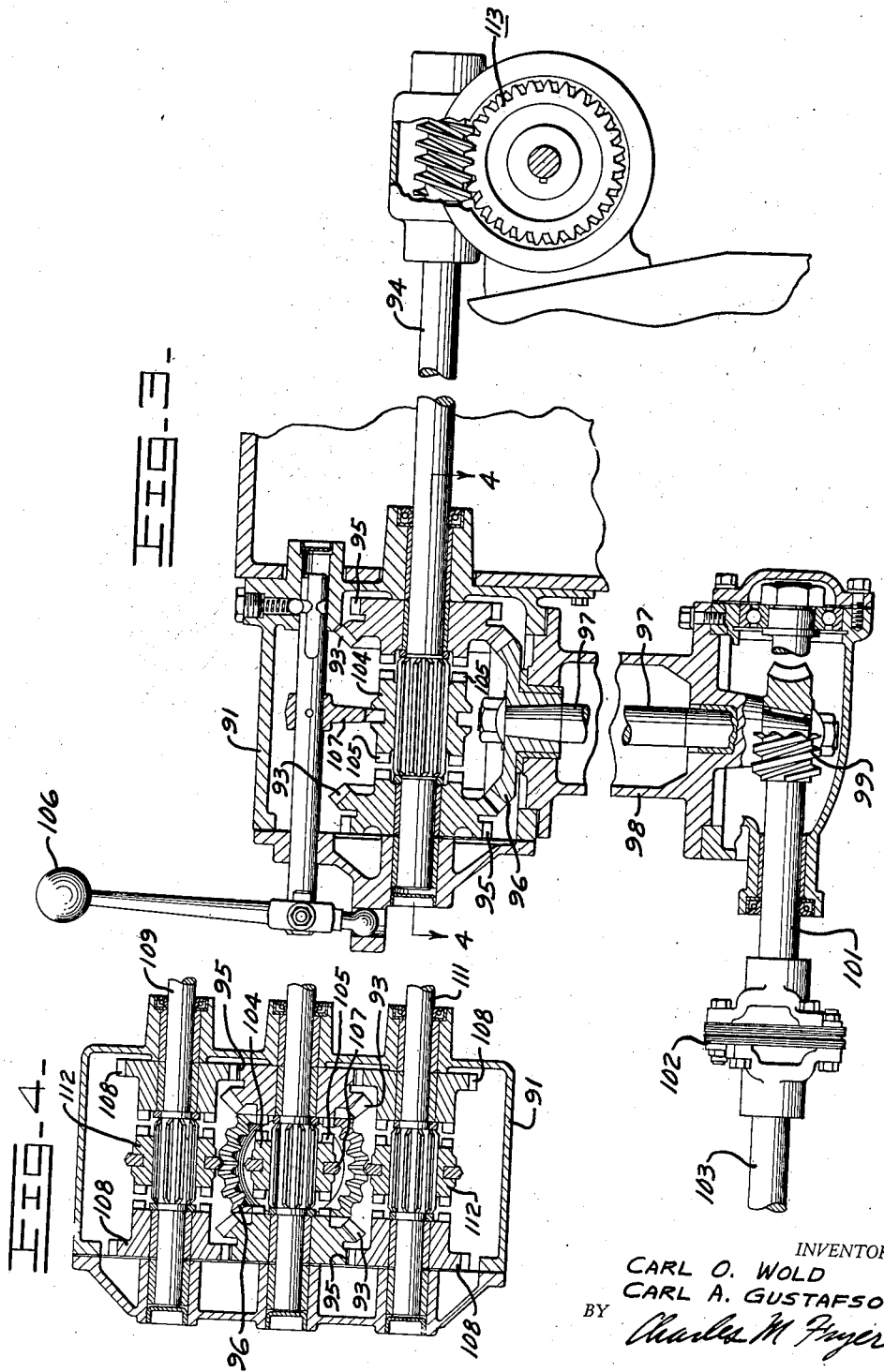

2,253,745

UNITED STATES PATENT OFFICE 2,253,745

SCRAPER

Carl O. Wold and Carl A. Gustafson, Peoria, Ill., assignors to Caterpillar Tractor Co., San Leandro, Calif., a corporation of California Application August 14, 1939, Serial No. 289,998

4 Claims. (Cl. 37—124)

Our invention relates to scrapers which are customarily employed for cutting, transporting and dumping earth in grading operations, and more particularly to a self-propelled scraper.

Scrapers generally comprise a scraper bowl structure mounted in a frame structure which is attachable to the drawbar of a tractor so as to be pulled thereby. The operator of the tractor is, hence, in front of the scraper which may be satisfactory when the load is being merely pulled for transportation, but which renders manipulation of the scraper burdensome when it is being loaded or discharged, because then it is necessary for the operator to look back to see what he is doing; and if during manipulation of the scraper, the operator has to manipulate the tractor at the same time, a very tiresome and difficult situation obtains. Furthermore, tractors are generally drivable at comparatively slow speeds, as a result of which the time consumed in transporting loads may render scraping operations more costly than they would otherwise be with high speed transportation.

Our invention is designed to overcome the above described difficulties, and has as its objects, among others, the provision of a self-propelled scraper machine in which the scraper mechanism and the power mechanism for propelling the machine form a complete machine unit capable of being driven at a comparatively high speed; the position of the scraper is such that the operator is in back of it to thus facilitate one man operation; the position of the scraper with respect to the rest of the machine provides for unimpeded visibility both for propelling of the machine and for scraping operations; the scraper can be conveniently and quickly manipulated; the engine and related propelling mechanism for the machine are located at the rear of the machine so as to be out of the way, and at the same time permit the operator's station to be positioned at a favorable location; and in which such position of the engine and related propelling mechanism provide for favorable weight distribution to enhance traction of rear drivable ground engaging means for the machine. Other objects of the invention will become apparent from a perusal of the following description thereof.

In general, the machine of our invention comprises a main frame including a rear section and a front section which are movably connected for pivotal movement about a horizontal axis, so that such sections can have relative vertical movement; the rear section having at the rear thereof propelling mechanism for the machine and being adapted to pivot vertically about the axis of final drive shafting of such propelling mechanism. Adjustable means is provided for effecting relative vertical movement between the rear section and the front section, about their point of pivotal connection so as to enable the rear section to be lowered and raised with respect to the ground. Such rear section supports the scraper bowl; and as a result of the described pivotal mountings thereof, the bowl can be lowered to cutting position on the ground when the scraper is to be loaded, and raised from the ground when the loaded bowl is to be propelled by the machine for transportation of the earth to a dumping position. An operator's station is located at the rear of the scraper bowl, preferably in front of the engine which is at the extreme rear of the machine so as to be out of the way; and control means is provided at the operator's station for effecting the described lowering and raising of the scraper bowl, and also other manipulations thereof. Steering of the machine is obtained through steerable ground engaging means at the front of the machine controllable from the operator's station; and to enhance steering for short turning, means is preferably provided for controlling the drive at either side of the machine. The ground engaging means is located within the swath which is made by the cutting edge of the bowl; so as to enable such cutting edge of the bowl to ride over a smooth ground engaging means is desirable for grading operations.

Reference will now be made to the drawings for more detailed description of the invention in which:

Fig. 1 is a more or less schematic plan view of the machine with some parts thereof broken away and shown in section to disclose more clearly the construction.

Fig. 2 is a schematic side elevation.

Fig. 3 is a vertical section, partly in elevation, of power control mechanism for operating parts of the machine; the section being taken in the plane indicated by line 3—3 in Fig. 1.

Fig. 4 is a horizontal section taken in a plane indicated by line 4—4 in Fig. 3.

Fig. 5 is an elevational view of an alternate form of ground engaging steering means for the machine.

Fig. 6 is a plan view of the structure shown in Fig. 5.

The main frame of the machine comprises front section 1 having front bolster 2 to which is secured dirigible front steering wheel mechanism 3 of any suitable construction. As can be observed more clearly from Fig. 1, such front section is provided with a U-shaped rear portion, formed by cross bar 4 and relatively widely spaced apart and downwardly extending side bars 6. For purposes of strength, the bars 4 and 6 are preferably hollow box-like structures. Also included in the main frame of the machine is a rear section 7 which comprises an adequately braced, rectangularly shaped front part composed of front cross bar 8, rear cross bar 9, and relatively widely spaced apart side bars 11. Bars 8 and 11 are preferably hollow box-like structures for purposes of strength; and the rear bar 9 is preferably a relatively large hollow cylinder for the same reason. Side members 6 of the front section are movably connected at 12 to side members 11 intermediate the ends of the rear section, for relative pivotal movement about a horizontal axis. A portion 13 of the rear section thus extends forwardly from the pivotal connections 12 and under the front section 1. The propelling mechanism for the machine is connected to the rear section 7 adjacent the rear end thereof through side members 14, also forming part of the rear section of the main frame and which are rigid with the rear tubular cross member 9.

Such propelling mechanism may be of any suitable construction including an engine, transmission and final drive mechanism. For example, propelling mechanism of the type shown in our assignee's patent to Gustafson No. 2,034,141, dated March 17, 1936, is satisfactory. The engine 15 of such propelling mechanism is located at the rear of the machine with the radiator 15' facing rearwardly, so as not to impede visibility, and also be out of the way of dust resulting from scraping operations or driving of the machine. An operator's station 16 is also at the rear of the machine in front of engine 15. In the embodiment of the invention chosen for the purposes of illustration, we have shown drivable rear ground engaging means in the form of tandem drive wheels 17 mounted on trucks 18 pivotable about the axis of final drive shafting 19. If desired, single drive wheels or any other form of drivable ground engaging means, may be driven by shafting 19, but the tandem drive wheels are preferred because of increased traction and because wheels enable the machine to be propelled at a comparatively high rate of speed for transportation of the load. In this connection, it is to be noted that inasmuch as all the propelling mechanism is at the rear of the machine adjacent the final drive shafting 19, a favorable weight distribution is provided for enhancing traction. Preferably, the final drive mechanism includes a differential 21 of any suitable construction.

From the preceding description, it will be apparent that the rear section 7 can pivot about the axis of shafting 19, and hence the forwardly extending portion 13 thereof can be moved upwardly and downwardly with respect to the ground, and also relative to front section 1. The attachment of front section 1 to the rear section does not interfere with such pivotal movement of the rear section, because of the pivotal connections 12 between such sections. When pivotal movement of rear section 7 occurs, in a manner to be described hereinafter, front section 1 will also have a pivotal movement about the axis of wheels 3, to thus provide a jackknife effect between such sections. Suitable means, which will be described more fully hereinafter, is provided for maintaining the rear section 7 fixed with respect to the front section 1, and which is also adjustable for raising or lowering the rear section.

A scraper mechanism 22 is supported in the rectangularly shaped portion of the rear section 7, and may be of any suitable type of which there are numerous on the market. For purposes of illustration, we have chosen scraper mechanism which comprises a main bowl 23 having front cutting edge 24, and which is movably supported at 26, by side members 11 of rear section 7, for pivotal movement about a horizontal axis. An auxiliary bowl or apron 27 is provided with rearwardly projecting arms 28 extending outside of main bowl 23, and which are pivotally connected at 29 to the main bowl adjacent the rear end thereof. Cutting edge 24 may be placed in cutting position on the ground by adjustment of the elevation of forwardly extending portion 13 of rear main frame section 7, through the adjustable mounting thereof previously described. In loading the scraper main bowl, apron 27 can be lifted by movement thereof about pivots 29. When the main bowl is filled, the main frame rear section 7 can be lifted after closing of apron 27 and the entire load transported by the machine, to the location where it is to be dumped. Dumping is accomplished by raising apron 27, and raising main bowl 23 about the pivots 26. The action of such type of scraper mechanism is well known. Any suitable means may be provided, such as hydraulic means, or worm and worm wheel drive shafting, for accomplishing the above described adjustments, but we preferably employ power operated cable control mechanism, which we shall now describe.

For raising or lowering the main frame rear section 7 and consequently the scraper mechanism 22, adjustable means is interposed between front section 1 and rear section 7 to effect relative vertical movement therebetween. Such means comprises a lower sheave 41 mounted centrally on front cross bar 8 of rear section 7, and an upper sheave 42 mounted on a suitable bracket structure 43 secured to the top of front section 1. A cable 44 is attached at 46 to the bracket 43, passes downwardly through a hole in the front part of front section 1 and around lower sheave 41, upwardly over upper sheave 42, and then downwardly through such hole in front section 1 to direction changing sheave 47 mounted on the front of rear section 7. From direction changing sheave 47, cable 44 is guided rearwardly to control mechanism by means of direction changing sheave 48, direction changing sheaves 49 and 51, direction changing sheave 52, guide wheel 53 and power driven winding drum 54. The hollow structure of the side members 11 of the rear section 7 provides convenient means for passage of cables therethrough so as to be out of the way; and it will be noted that cable 44 passes through the left-hand side member 11. From the preceding, it will be apparent that winding of cable 44 in either direction by winding drum 54 will result in raising or lowering of the rear section 7 depending upon the direction of winding of the drum.

Tilting of bowl 23 about pivots 26 is accomplished through a pair of spaced cables 61, the lower end 62 of each of which is attached to a side of the bowl adjacent the rear thereof. Such cables 61 extend upwardly from their attached ends and pass over sheaves 63 mounted on brackets 64 secured to side frame members 11. From sheaves 63, the cables extend downwardly and pass into tubular rear member 9, over direction changing sheaves 66, direction changing sheaves 67, upwardly to guide wheels 68 and to power driven winding drums 69.

Adjustment of auxiliary bowl or front apron 27 is accomplished through cable 71 which is attached at the lower end thereof to bracket 72 secured to the apron, and which extends upwardly over sheave 73; such sheave 73 being mounted on a cross piece 74 supported on the spaced brackets 76 secured to the front of side members 11. From sheave 73, cable 71 passes downwardly to direction changing sheaves 77, rearwardly through the inside of right-hand side member 11 to direction changing sheaves 78, and inwardly to sheave 79 from which it passes over guide pulley 81 to power operated winding drum 82.

Any suitable mechanism may be employed to effect rotation of winding drum 54 to adjust raising and lowering of the bowl, winding drums 69 to adjust tilting of the bowl, and winding drum 82 to adjust the apron, but we prefer to employ self-locking power control mechanism of the type disclosed in our previously mentioned assignee's Patent No. 2,034,141, dated March 17, 1936. Such mechanism is operated from the engine, and includes a plurality of reversible operable clutch assemblies grouped within a common housing 91 located adjacent the operator's station 16 of the machine. As can be seen from Figs. 3 and 4, a central one of such assemblies comprises oppositely positioned bevel gears 93 journaled about a shaft 94 journaled in housing 91; each of gears 93 having integral therewith a spur gear 95. The bevel gears 93 mesh with a bevel gear 96 secured to upright shaft 97 which extends downwardly through tubular bracket 98, and which is connected at its lower end through worm gearing 99 with shaft 101 connected through flexible coupling 102 with shaft 103 continuously driven from engine 15, in the manner disclosed in the previously referred to patent.

Bevel gears 93 are thus continuously rotated in opposite directions; and by means of a clutch element 104 splined for rotation with shaft 94 and axially shiftable to engage either gear 93 through clutch teeth 105, by proper manipulation of control handle 106 connected to clutch control fork 107 which engages clutch element 104, shaft 94 may be selectively rotated in either one of opposite directions when so desired, to effect adjustment of the mechanism which may be connected to such shaft 94. The spur gears 95 mesh with similar pairs of spur gears 108, one pair of which is journaled about a shaft 109 at one side of shaft 94, and another pair of which is journaled about shaft 111 at the opposite side of shaft 94. Inasmuch as spur gears 95 are continuously rotated in opposite directions, the spur gears 108 about each shaft 109 and 111 are also continuously driven in opposite directions. By means of a clutch element 112 about each of shafts 109 and 111, similar and controllable in the same manner as clutch element 104, each of shafts 109 and 111 can thus be rotated in either one of opposite directions, to effect adjustment of mechanism connected thereto.

Shaft 94 is connected through a self-locking worm and worm wheel drive 113 to the pair of winding drums 69, which are connected to the cables 61 for adjusting tilting of bowl 23; shaft 109 is connected through a similar self-locking worm and worm wheel drive in housing 114, to winding drum 54 connected to cable 44 for raising and lowering the bowl; and shaft 111 is connected through another similar self-locking worm and worm wheel drive in housing 115, to winding drum 82 connected to cable 71 for adjusting the position of apron 27.

Thus, operation of the scraper mechanism 22 may be readily controlled from operator's station 16 by the operator; and since engine 15 is at the rear of the operator's station, the operator has free and unimpeded visibility enabling efficient loading and unloading of the bowl, as well as propulsion of the machine. In this connection, steering of the machine is conveniently controlled from the operator's station by means of steering wheel 116 connected to suitable shafting 116', in turn connected through suitable gearing in housing 117 to the front steering wheels 3. Although hand controlled steering mechanism is disclosed for purposes of illustration, it is obvious that power steering mechanism may be readily employed if this is so desired.

The machine has a relatively long wheel base, as can be noted from Figs. 1 and 2, for the purpose of minimizing the effect in inequalities of elevation of the ground being cut upon the cutting edge 24, which is particularly important when such cutting edge is cutting to grade. It may therefore be desirable to provide means in addition to conventional front steering wheels 3, to cooperate in enabling short turning of the machine when steering is desired. We, therefore, preferably employ in conjunction with differential mechanism 21 any suitable control mechanism therefor, for controlling the drive to the driving wheels 17 at either side of the machine; so that the driving wheels at one side may be held stationary or driven at a different speed than the driving wheels at the other side. There are numerous of these mechanism available; and for purposes of illustration we have chosen a type of mechanism similar to that disclosed in the patent to Eidson et al., No. 1,243,720, dated October 23, 1917. Such mechanism, which is schematically illustrated in Fig. 1, briefly comprises a clutch collar 118 at each side of the differential 21 and which is controllable through suitable linkage 119, by a foot operable lever 121 at operator's station 16, to lock either side of the differential, or when operated together to lock the entire differential so that no differential action obtains. In place of mechanism of the character described, steering clutches, of the type commonly employed in track-type tractors, may be utilized to provide a similar result.

Also, for the purpose of facilitating short turning, we may employ instead of a pair of dirigible steering wheels 3, a single steerable wheel 122, as is illustrated in Figs. 5 and 6, controllable from operator's station 16 through shafting 123 connected to the wheel by means of gearing in housing 124.

With reference to Fig. 1, it will be noted that the driving wheels 17 as well as the front wheels are within the widthwise dimension of the scraper bowl cutting edge 24, and consequently within the path or swath cuttable by such cutting edge. As a result, after a first cut is made on a section of ground, the wheels will always tread over level ground already cut by the cutting edge 24, which is important for cutting to grade.

From the preceding, it is seen that our self-propelled scraper machine is very readily operable and propellable by a single operator who can thus accomplish his work efficiently. At the same time, the machine being of special design and being a complete unit may be powered with propelling mechanism enabling driving thereof at a comparatively high rate of speed when transporting a load. The high speed feature is enhanced by the preferred employment of ground engaging wheels instead of other types of drivable ground engaging means; and such wheels are all preferably provided with inflated rubber tires because they enable smoother travel and faster speed.

We, therefore, claim as our invention:

1. A self-propelled scraper machine comprising a frame including a plurality of sections pivotally connected together about a horizontal axis for relative vertical movement, steerable front ground engaging means connected to one of said sections, drivable rear ground engaging means connected to another of said sections, an engine adjacent the rear of said frame and connected to said another section, an operator's station on said another section and in front of said engine, a scraper bowl supported by said another section in front of said operator's station, adjustable means for effecting relative movement between said sections, and control means for said adjustable means located at said operator's station.

2. A self-propelled scraper machine comprising a frame including a front section and a rear section pivotally connected to said front section about a horizontal axis for relative vertical movement with respect thereto, adjustable means for effecting relative movement between said sections, propelling mechanism for said machine including an engine and final drive shafting about the axis of which said rear section can pivot, steerable front ground engaging means connected to said front section, rear ground engaging means drivable by said shafting, and a scraper bowl supported by one of said sections.

3. A self-propelled scraper machine comprising a frame including a front section and a rear section having a pivotal connection with said front section about a horizontal axis; said pivotal connection being located intermediate the ends of said rear section to provide a portion of said rear section which extends forwardly from said pivotal connection underneath said front section; propelling mechanism for said machine associated with said rear section including an engine, drivable rear ground engaging means and final drive shafting therefor about the axis of which said rear section can pivot; an operator's station associated with said rear section; steerable front ground engaging means connected to said front section; a scraper bowl movably supported by said rear section; adjustable means connected between said forwardly extending portion of said rear section and said front section to effect relative movement between such sections and thereby raising or lowering of said bowl; other adjustable means connected to said bowl for effecting movement thereof relative to said rear section; and power control means drivable by said engine for adjusting said adjustable means and controllable by an operator at said operator's station.

4. A self-propelled scraper machine comprising a frame including a front section and a rear section having a pivotal connection with said front section about a horizontal axis, said pivotal connection being located intermediate the ends of said rear section to provide a portion of said rear section which extends forwardly from said pivotal connection underneath said front section, propelling mechanism for said machine including an engine at the rear of said rear section, drivable rear ground engaging means at each side of the machine and final drive shafting therefor about the axis of which said rear section can pivot, an operator's station on said rear section in front of said engine, steerable front ground engaging means, a scraper bowl movably supported by said forwardly extending portion of said rear section, adjustable means connected between said forwardly extending portion of said rear section and said front section to effect relative movement between such sections and thereby raising or lowering of said bowl, other adjustable means connected to said bowl for effecting movement thereof relative to said rear section, power control means drivable by said engine for adjusting said adjustable means and controllable by an operator at said operator's station, control means at said operator's station for said steerable front ground engaging means, and mechanism for controlling the drive to each of said rear ground engaging means to facilitate steering of said machine.

CARL O. WOLD.
CARL A. GUSTAFSON.